United States Patent [19]

Thorne

[11] Patent Number: 5,099,407
[45] Date of Patent: Mar. 24, 1992

[54] INVERTER WITH POWER FACTOR CORRECTION CIRCUIT

[76] Inventor: Richard L. Thorne, 29 A Creekside Cir., Elgin, Ill. 60123

[21] Appl. No.: 589,085

[22] Filed: Sep. 24, 1990

[51] Int. Cl.⁵ .......................................... H02M 5/458
[52] U.S. Cl. ..................... 363/37; 315/220; 315/223; 315/DIG. 4; 315/DIG. 7; 363/49; 363/56; 363/143
[58] Field of Search ............... 363/37, 49, 56, 95, 363/98, 143; 315/212, 223, 226, DIG. 5, 224, DIG. 7

[56] References Cited

U.S. PATENT DOCUMENTS

| | | | |
|---|---|---|---|
| 3,155,875 | 11/1964 | Wenrich et al. | 315/189 |
| 3,611,021 | 10/1971 | Wallace | 315/239 |
| 3,733,537 | 5/1973 | Kernick et al. | 363/56 |
| 3,753,071 | 8/1973 | Engel et al. | 315/201 |
| 3,820,005 | 6/1974 | Steigerwald | 363/96 |
| 3,889,153 | 6/1975 | Pierce | 315/209 R |
| 4,017,785 | 4/1977 | Perper | 315/221 |
| 4,042,871 | 8/1977 | Grubbs et al. | 363/28 |
| 4,060,751 | 11/1977 | Anderson | 315/209 R |
| 4,079,444 | 3/1978 | Kuhn | 363/56 |
| 4,199,710 | 4/1980 | Knoll | 315/205 |
| 4,251,752 | 2/1981 | Stolz | 315/206 |
| 4,259,614 | 3/1981 | Kohler | 315/219 |
| 4,259,616 | 3/1981 | Smith | 315/256 |
| 4,277,728 | 7/1981 | Stevens | 315/307 |
| 4,330,736 | 5/1982 | Perper | 315/209 R |
| 4,346,332 | 8/1982 | Walden | 315/307 |
| 4,375,608 | 3/1983 | Kohler | 315/307 |
| 4,388,561 | 6/1983 | Koshimura et al. | 315/171 |
| 4,392,086 | 7/1983 | Ide et al. | 315/174 |
| 4,506,195 | 3/1985 | Elms | 315/205 |
| 4,658,343 | 4/1987 | Shepard, Jr. | 363/22 |
| 4,677,345 | 6/1987 | Nilssen | 315/209 R |
| 4,686,427 | 8/1987 | Burke | 315/219 |
| 4,914,558 | 4/1990 | Flickinger | 363/17 |

OTHER PUBLICATIONS

IBM Technical Disclosure Bulletin vol. 31, No. 6, Nov. 1988, Constant Power Fusing Arrangement for 110/220 Volt Power Supplies.

*Primary Examiner*—William H. Beha, Jr.
*Attorney, Agent, or Firm*—Kajane McManus; Mathew R. P. Perrone, Jr.

[57] ABSTRACT

The inverter circuitry requires minimal operating input power, is power factor correcting and may, if desired, include a dimming circuit. The circuitry further includes a runaway protection circuit which is activated upon sensing of a no load condition to place the inverter circuitry in a standby mode of operation.

48 Claims, 2 Drawing Sheets

5,099,407

INVERTER WITH POWER FACTOR CORRECTION CIRCUIT

BACKGROUND OF THE INVENTION

The present invention relates to inverter circuitry for use in driving a load, such as fluorescent lamps, which is power factor correcting, which requires minimal operating power input, and which may, if desired, include a dimming circuit therein.

PRIOR ART

Heretofore, various circuits have been proposed for use in driving a load, such as a fluorescent lamp.

For example, the Nilssen U.S. Pat. No. 4,677,345 discloses a high-efficiency inverter circuit, more particularly a half-bridge device, which is especially suitable for energizing gas discharge lamps. The inverter preferably employs a series-connected combination of an inductor and a capacitor to be energized upon periodic transistor conduction. Transistor drive current is provided through the use of at least one saturable inductor to control the transistor inversion frequency to be equal to or higher than the natural resonant frequency of the inductor and capacitor combination. The inverter can develop a high output voltage to supply an external load connected to the inductor-capacitor combination.

Also, electronic ballast systems including means for selectively allowing full or partial transfer of source current or power therethrough have been proposed.

For example, a fluorescent lamp dimming switch is disclosed in the Burke U.S. Pat. No. 4,686,427 wherein an electronic ballast system for operating fluorescent lamps at full and partial brightness has a series reactance selectively switched into or out of the system by a reactance switch. The electronic ballast has an input filtering section, a voltage-clamped current source, and an oscillator whose frequency is determined in part by load reactance. Series filament capacitors provide lamp filament power control during starting and running at full and partial brightness.

Further, ballast circuits specifically designed for use with high intensity discharge lamps have also been proposed. Examples of such circuits may be found in the Shepard, Jr. U.S. Pat. No. 4,658,343; the Elms U.S. Pat. No. 4,506,195; the Kohler U.S. Pat. No. 4,375,608; and the Smith U.S. Pat. No. 4,259,616, to name a few.

As will be described in greater detail hereinafter, the circuit of the present invention differs from those previously proposed by providing a circuit which is power factor correcting, which uses part of the inverter output to provide the power factor correction, decreasing the amount of peak input current required for system function, and which may be provided with means for producing an output current which is variable between a predetermined minimum and maximum value.

SUMMARY OF THE INVENTION

According to the invention there is provided an inverter circuit including circuitry components for performing various functions, the circuitry including: structure for receiving an AC power input; structure for adjusting that power input to a desired output parameter and outputting same as a DC output; structure for taking the DC output and providing same through a series of devices to a power unit and modifying the input in respect of a load placed upon the power unit; the circuit further including structure for sensing when the load is missing and allowing the power unit to remain in a standby mode of operation until a load is sensed; and further being capable of including structure for selectively controlling the amount of power available to the load.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENTS

Figure 1:
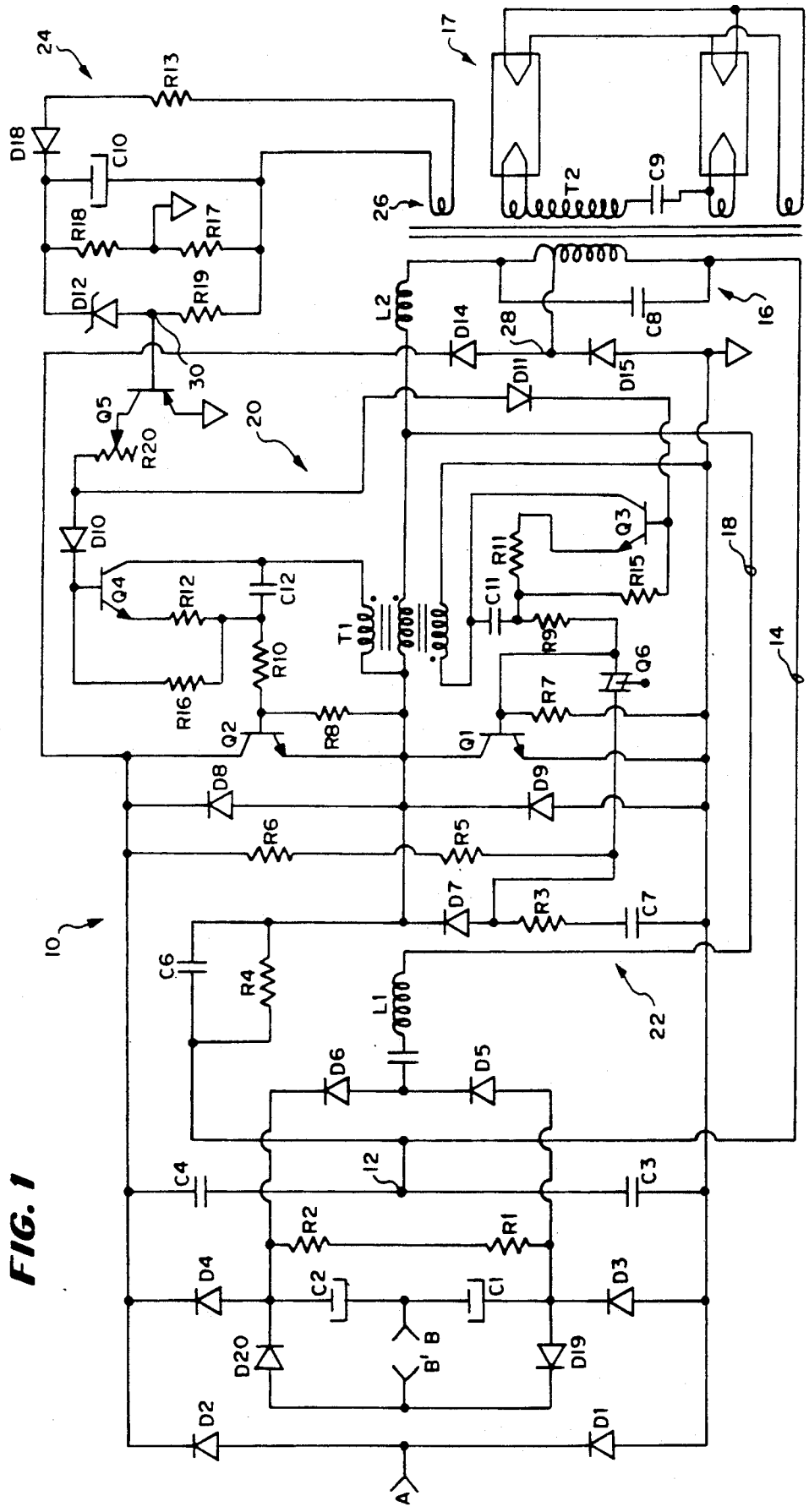
FIG. 1 is a detailed schematic of the inverter circuit of the present invention.

Referring now to the drawings in greater detail there is illustrated in FIG. 1, one embodiment of the inverter circuit of the present invention generally identified by the reference numeral 10. AC power is provided to the circuit 10 through a conventional radio frequency interference filter circuit (not shown) at A and either B, or B', with B being used as the input for a source between 100 and 132 V AC and B' being used as the input for a source between 200 and 305 V AC.

Except for diodes D3 and D4 whose function will be defined later, when connected to A and B', the power from the source passes through a full-wave bridge rectifier formed by diodes D1, D2, D19 and D20, or, when connected to A and B, is configured in the style of a voltage doubling circuit. Capacitors C1 and C2 are relatively slowly charged by a DC voltage generated as a high frequency AC voltage within an oscillator/inverter circuit to be defined hereinafter, the voltage being rectified by further diodes to be defined hereinafter.

Resistors R1 and R2 are placed across the DC power capacitors, C1 and C2 to discharge them when the AC power is removed.

Diodes D3 and D4 isolate capacitors C1 and C2 from diodes D1 and D2 in order to prevent capacitors C1 and C2 from being directly charged by the power source. Instead, as described above, the charging of capacitors C1 and C2 is accomplished using high frequency current from an oscillator, to be defined, through inductor L1, capacitor C5 and diodes D5 and D6. As is described in greater detail hereinafter, this arrangement of components provides power factor correction within the circuit 10.

As will be defined in greater detail hereinafter, the circuit 10 drives a resonant circuit 16, consisting of a primary of a transformer T2, a capacitor C8, and an inductor L2.

Bypass capacitors C3 and C4 are provided to form one leg of an H bridge converter, the other leg of which is formed by transistors Q1 and Q2, to be described.

A center tap 12 is provided between capacitors C3 and C4 which connects to a high frequency AC current return line 14 feeding current back to this junction from a resonant tank 16 of the circuit 10. The bypass capacitors C3 and C4 provide a high frequency AC return path which is centered between the absolute maximum and the absolute minimum power supply voltages and keeps diodes D3 and D4 isolated from the high frequency AC current being produced. protecting circuit integrity.

This configuration produces a simple AC current bypass path. allowing the AC current within the circuit 10 to be effectively isolated from diodes D1 through D4. D19 and D20.

Diodes D5 and D6 are provided in the circuit 10 for power factor correction within the circuit 10. In this respect, diodes D5 and D6 charge capacitors C1 and C2 with power available at the output of oscillator/inverter circuit 20, via line 18 which includes inductor L1 and capacitor C5, capacitor C5 producing a DC blocking effect.

High frequency voltage generated on line 18 passes through inductor L1, which can be selected to control the charging rate for the DC storage capacitors C1 and C2, and through capacitor C6 which blocks any low frequency voltage, such as the input AC power, and allows only high frequency current from the oscillator-/inverter circuit 20 to charge capacitors C1 and C2.

Charging of capacitors C1 and C2 is done in one of two manners with respect to input power connections A and B or A and B'.

Depending on the polarity of the input AC power, when the A and B' connection is used, either diode D5 or D6, depending on the polarity of the high frequency voltage on line 18, will charge both capacitors C1 and C2 in series.

The charging current through either diode D5 or D6 will return to the oscillator/inverter circuit 20 along line 14, via diode D19, the power source, companion diode D2 and capacitor C4, or via diode D20, the power source, companion diode D1 and capacitor D3, depending on the polarity of the AC power input.

Referring to the alternate power connection of A and B, charging current is supplied to either capacitor C1 or C2, depending on the polarity of the high frequency AC voltage on line 18 and the polarity of the AC input power. The charging current for capacitor C2 flows through C2, the power source, companion D1, capacitor C3 and along line 14.

The charging current for capacitor C1, on the other hand, flows through diode D5, capacitor C1, the power source, companion diode D2, capacitor C4 and along line 14.

When input power is below the value stored in capacitors C1 and C2, charge comes off capacitors C1 and C2 through diodes D3 and D4 to provide power to the circuit 10.

When input power becomes higher than the stored charge on capacitors C1 and C2, diodes D1-D4 provide power to the circuit 10, and some power is fed through inductor L1, capacitor C5, diodes D5 and D6 (and diodes D19 and D20 if B' is used) to store charge in capacitors C1 and C2 in a controlled fashion as described above.

The elements of the circuit 10 are judiciously arranged to provide a power factor which is higher than 0.90, with 0.95 being preferred.

To simplify reading of the circuit 10, it will be understood that the circuit 10 disclosed is, again, a resonant circuit 10 with the amount of charging current being provided to the capacitors C1 and C2 being controlled by the provision of inductor L1. The line 18 including inductor L1 and capacitor C5 originates at a junction of a second inductor L2 and transformer T1, which determines the frequency of oscillation of the oscillator/inverter circuit 20 without a resonant load thereon, i.e., by virtue of the saturation of the transformer T1 (such as, for example, a saturable inductor in the form of a small toroid running at 25-30 kiloHertz).

The current that flows through the transformer T1 will determine when the transformer T1 saturates and will determine the basic running frequency of transformer T1. Therefore, by directing the output of transformer T1 through series connected inductor L1 and DC blocking capacitor C5, a frequency changing effect is produced, based on the amount of current flowing to charge capacitors C1 and C2.

The DC supply voltage is made less erratic in this manner because the current being supplied for power factor correction is part of the current flowing through transformer T1, which influences the frequency of oscillation.

A starting circuit 22 for the oscillator/inverter circuit 20 includes diode D7, resistor R3, capacitor C7, a triggering device Q6 such as, for example, a bidirectional trigger diode (diac) Q6, and transistor Q1. When power is first provided to the oscillator/inverter circuit 20, current is supplied through resistors R6, R5 and R3 to capacitor C7 which will charge up until the breakdown voltage of diac Q6 is reached.

Diac Q6 will then fire a pulse of current into transistor Q1 which will then kick the oscillator/inverter circuit 20 to get it started. The oscillator/inverter circuit 20 may self start, depending on the transistors, temperature, etc., however in the circuit 10 disclosed, the oscillator/inverter circuit 20 is certain to start under most conditions.

After the circuit 20 has begun to run, diode D7, which is connected to the collector of transistor Q1, keeps the charge on capacitor C7 below the value that will fire diac Q6. In this way the production of spurious starting pulses is avoided.

The destruction of the oscillator/inverter circuit 20 would be inevitable if transistors Q1 and Q2 both turned on at the same time, so the charge on capacitor C7 is kept low by having diode D7 on the collector of transistor Q1, since transistor Q1 spends approximately half of its time essentially at ground.

Transistor Q1 will discharge capacitor C7 every half cycle and capacitor C7 cannot recharge quickly because the values chosen for resistors R5 and R6 are large. Thus, it takes time to build a charge in capacitor C7. Further, capacitor C7 is never allowed to fully charge, the charge thereon being pulled down by diode D7. This maintains diac Q6 turned off, after it has produced the single pulse to start the oscillator/inverter 20.

Once the oscillator/inverter circuit 20 is running, transistors Q1 and Q2 operate through feedback from transformer T1, providing an inversion, with current flowing through transformer T1 saturating the transformer T1 so that drive to the bases of transistors Q1 and Q2 will alternately switch on and off.

When utilizing a resonant circuit 10 as is done here, a resonant frequency is chosen which is slightly lower than the driving frequency of saturating transformer T1.

Once the oscillator/inverter circuit 20 is started, the resonant circuit 10 will resonate and will not allow the oscillator/inverter circuit 20 to restart in the opposite direction until the current passes through a zero voltage crossing, at which point, the other side of the oscillator-/inverter circuit 20 will turn on.

A "dead" period is provided at the zero crossing to avoid turning on transistors Q1 and Q2 at the same time, and causing what is commonly referred to as shoot-through or cross-over. The provision of the "dead" period also provides for turning on of transistors Q1 and Q2 with zero voltage across them because current is still flowing in the opposite direction of the transistor Q1 and/or Q2, due to resonance.

Since a resonant current is not easily contained, a path must be provided for it, and depending on the side of the circuit 10 being considered, either diode D8 or D9 will turn on, conducting the resonant current. In other words, diodes D8 and D9 provide a discharge path for the resonant current to flow along before transistors Q1 and Q2 are turned on.

When either the transistor Q1 or Q2 turns on, it turns on into zero voltage because the respective diode D8 or D9 is already conducting, with the respective transistor Q1 or Q2 taking over until the next cycle starts, and so on, providing a very safe method of running the oscillator/inverter circuit 20, protecting the transistors Q1 and Q2, and allowing them to run cooler because they are not switching on into high voltage, but rather switching on at the zero voltage crossing.

Base resistors R7 and R8 simply provide resistances within the circuit 10 to reduce leakage in the bases of the transistors Q1 and Q2, and force onto the transistors Q1 and Q2 a particular bias level, while also providing a good resistive load for the secondaries of transformer T1.

In this respect, as known, it is difficult to drive into a diode junction, like a base emitter junction, which can present the appearance of being both inductive and capacitive. By using the resistances within the circuit 10, those impedances provide stable loads for the secondaries of transformer T1 and stabilize operation of the circuit 10.

Also, the breakdown voltage of the transistors Q1 and Q2 is raised when base resistors R7 and R8 are provided.

Thus, in essence, without capacitors C11 and C12, and the transistors and devices connected to them, to be described hereinafter, a basic oscillator/inverter circuit 20 running on its own, at a fixed frequency, is provided, with the circuit 20 being adjustable to produce, for example, a required light output, as will be described.

By the provision of capacitors C11 and C12, the switching time of the secondaries of transformer T1 is changed. This change is dependent on the amount of energy stored within each capacitor C11 and C12, with the amount of stored energy being dependent on: the voltage across the winding of transformer T1; the particular saturation flux of transformer T1, which is fixed; and the time that it takes to saturate, which is dependent on the voltage present. By providing capacitors C11 and C12, the voltage attained by transformer T1 is controlled.

Travelling around one loop of the oscillator/inverter circuit 20, choosing the path incorporating transistor Q2, the voltage across capacitor C12, the voltage across resistor R10, and the voltage across transistor Q2's base emitter junction must equal the voltage across the secondary of transformer T1; and the voltage on the secondary of transformer T1 will determine the frequency, or the time to saturation, of transformer T1.

Without providing transistors Q3 and Q4, the voltage present in capacitors C11 and C12 would assume a value based on known parameters, such as resistances, and the turns ratio of transformer T1, among others. Each time a transistor Q1 or Q2 is turned on its corresponding capacitor, C11 or C12, respectively, is charged up to a certain value, which is constant.

For example, when capacitor C11 is charging, transistor Q4 can be turned on to discharge capacitor C12. Inversely when capacitor C12 is charging, transistor Q3 can be turned on to discharge capacitor C11.

Typically, depending on the amount of discharge, a residual voltage of approximately 0.1 volts up to 5 volts may remain. The range within which this residual voltage will lie can be chosen for a particular circuit, as required.

Upon discharging capacitor C11 or C12, the particular residual voltage provided becomes the voltage that will be applied to the next cycle in the process of saturating the transformer T1. Thus, the saturation time is controlled by the charge on the capacitor C11 or C12.

For full output current from the oscillator 20, the residual charge on capacitors C11 and C12 is reduced to minimum, causing the transformer T1 to reach its flux saturation point later. If there is a larger residual voltage provided, then the transformer T1 will spend less time reaching its flux saturation point thereby generating a higher frequency.

When driving a resonant circuit 16, described as including capacitor C8 and inductor L2, the closer the inverter frequency is to the natural resonant frequency of the load 16, the more power will be transferred to a load 17 on resonant circuit 16, for example, fluorescent lamps. Conversely, as the inverter frequency increases, and therefore moves away from the natural resonant frequency of circuit 16, the less power is transferred to the load 17.

To assure that "run-away", defined below, of the circuit 10 does not take place a protection circuit 24 is provided. A Zener diode D12 of the protection circuit 24 removes the effect of a resistor R20 by turning off transistor Q5 when the load is missing. This action allows capacitors C11 and C12 to charge fully, with no discharge path provided when transistor Q5 is biased off. Thus, discharge will not take place until transistor Q5 is turned on because transistor Q5 is the control means for transistors Q3 and Q4 which control the charging of capacitors C11 and C12, respectively.

Additionally, the voltage on capacitors C11 and C12 is controlled by turning on and off transistors Q3 and Q4, respectively which are controlled through diodes D11 and D10, respectively, through variable resistor R20 and transistor Q5.

To control transistor Q5, resistors R17 and R18 are provided to form a control voltage supply which has both positive and negative values referenced to circuit common 25 to control transistor Q5. The Zener diode D12, when the voltage increases, breaks down and conducts, generating a small voltage, effectively removing the effect of resistor R20, by turning off the transistor Q5, when the load 16 is missing.

When no load 17 is present on the secondary of transformer T2, voltage thereacross will be high. Since control winding 26 is also on transformer T2 its voltage will also be high, thereby charging capacitor C10 to a high voltage through diode D18 and current limiting resistor R13. The voltage on diode D10 reaches a level that surpasses the breakdown voltage of Zener diode D12 which conducts through resistor R12 and places a positive voltage, referenced to circuit common 25, on the base of transistor Q5, thereby biasing it off.

When a load 17 is present, Zener diode D12 does not break down, allowing transistor Q5 to turn on, allowing current to flow therethrough.

When even a nominal load 17 is present, the voltage across control winding 26 of transformer T2 is reduced as is the voltage across capacitor C10, which then causes diode D12 to be biased off and PNP transistor Q5 biased on through resistor R19. Current is then conducted through resistor R20, with charging of capacitors C11 and C12 being controlled by transistors Q3 and Q4 and resistor R20.

Any Zener voltage may be chosen as long as sensing of a load missing provides a high enough voltage to break down the Zener diode D12, thus blocking base current to PNP transistor Q5.

Returning now to the oscillator/inverter circuit 20, it will be understood that if Q1 is turned on, then its collector is connected down to its emitter, which is the common side of the power supply.

At that time, current can flow through resistor R20, diode D10, through the base of transistor Q4, through its emitter resistor R12, through resistor R10, through resistor R8, through transistor Q1, and back to the common point. The transistor Q2 has essentially been turned on by providing base current to it only when transistor Q1 is on.

In other words, the circuit 10 is always preparing for the next cycle by bleeding capacitor charge away to a predetermined value chosen by setting the variable resistor R20 or similar device, such as a photoisolator.

It would be possible with the circuit 10 to tie together several variable resistors R20 in one room for instance, and provide one controller for controlling them simultaneously, although some isolation might be necessary so that all the resistors R20 could be tied to one controller. Whatever means might be chosen, a variable resistance R20 to control the base drive on the transistors would be necessary to control the amount of collector current, which then discharges the capacitors C11 and C12.

The amount of discharge over the chosen time period of the cycle is dependent on the amount of current flowing. The amount of voltage remaining upon entering the next cycle depends on the amount of discharge, and the voltage controls the transformer parameter which sets up cycle frequency.

Turning now to the other side of the oscillator/inverter circuit 20, when transistor Q2 is turned on, and transistor Q1 is off, the path is more direct to the common point, through resistor R20, diode D11, the base of transistor Q3, through emitter resistor R11, resistor R9 and resistor R7.

The particular circuit 10 disclosed does not require the voltage on capacitors C11 and C12 to be identical, providing a benefit to the oscillator/inverter circuit 20 in that the currents are allowed to be different naturally, with the oscillator/inverter circuit 20 taking up such variations in the transistors and magnetics so no DC imbalance factors are generated, as explained below.

A further benefit of the circuit 10 is the provision of the AC coupling therein since it is impossible to perfectly balance both sides of the oscillator/inverter circuit 20.

There will always be some small difference and this difference is absorbed in capacitors that can assume slightly different DC levels while they are operating to bypass the AC parts of the circuit 10. In other words, this circuit 10 is tolerant of the variables which always exist in electrical components.

Within the particular circuit 10 disclosed, the load 17 here comprises inductor L2 in series with the primary of transformer T2. The inductance on the primary of transformer T2 forms the inductive part of the resonant tank circuit 16 which further includes capacitor C8. Capacitor C8 and transformer T2 are chosen to resonate at some high frequency, slightly lower than the natural frequency of saturation of transformer T1 to ensure that oscillator/inverter circuit 20 waits for the resonant tank 16 to reverse its energy flow. If energy were to come back before or at the same time that the opposite side of the oscillator/inverter circuit 20 was turning on, a system crash would take place.

By choosing the resonant frequency to be slightly lower than the driving frequency, a crash is avoided, by once again, providing the "dead" time period within the circuit 10, as defined above.

In this respect, the oscillator/inverter circuit 20 finishes before the energy in the resonant tank 16 can actually reverse itself. The oscillator/inverter circuit 20, that is, the saturation of transformer T1, is actually waiting to reverse itself until the resonant current has reversed itself. An appropriate wait time must be chosen inasmuch as too long a wait period will cause ringing, decreasing efficiency in energy transfer, while too short a wait period may produce a system crash.

The resonant tank 16 is provided in the primary of transformer T2. During starting, the oscillator/inverter circuit 20 is in a standby high frequency mode of operation, waiting for, in this example, the lamps to start, producing a situation similar to a no load situation, because the lamps are not electrically present until the gas is ionized and such starting may take a few milliseconds.

Within such a ballast, the resonant circuit 10 would be destroyed because energy would be released before the lamps could absorb it and the inverter/oscillator circuit 20 would become overloaded.

To eliminate this possibility, the frequency of the circuit 10 is set high, although not too high, in dependence on the load. Also, the frequency cannot be set so high as to protect the oscillator/inverter circuit 20 totally during starting and still start the load. Certain conditions always exist; for example in the case of fluorescent lamps, the lamps may need to be started at temperatures as low as fifty degrees Fahrenheit and lower as required, by circuit design. Some fluorescent lamps are harder to start than others, i.e., T-8 lamps, such as sold by Sylvania under the trademark Octron, and energy saving lamps are very hard to start, while ordinary lamps are easy to start.

Accordingly, two clamping diodes D14 and D15 are tapped into the primary of transformer T2 and will limit the voltage during the starting period by clamping the voltage away immediately before starting, acting as a "safety net" during conditions which may cause the oscillator/inverter circuit 20 to start while not controlled by either the shutdown protection circuit 24 or a dimming circuit, to be defined. In other words, these clamping diodes D14 and D15 take energy and dissipate it during any brief period of time before any circuit protection device is operative.

Then, timing becomes relatively unimportant. In this respect, one second is a long time in this type of circuit, inasmuch as only microseconds are needed for switching. Clamping diodes D14 and D15 can absorb energy for up to several minutes, giving devices in the circuit 10 a chance to work at their own pace, without need for fine tuning the devices, while still providing a viable ballast.

Once the circuit 10 is running, the output voltage is reduced. For example, fluorescent lamps are like most gaseous lamps; they require a high voltage to start and when they finally do conduct, they fall back to requiring only a relatively small percentage of the starting voltage for running.

When the circuit 10 is under a load, such as, for example, one consisting of two ordinary 40W fluorescent lamps, the voltage across the load will drop to approximately one hundred volts for each lamp in series. Consequently, the voltage at the tap 28 between diodes D14 and D15 is below the point at which the diodes D14 and D15 will conduct and they remain idle, unless clamped on during starting as described above.

The turns ratio of transformer T2 is chosen to provide enough voltage to start the load. Capacitor C9 acts as a DC blocking capacitor again because the fluorescent lamps, chosen in this example to represent the load, are notorious for not conducting the same in both directions. They become giant glass diodes and if such imbalance is not allowed for, DC imbalance factors begin to run in the transformers causing high peak current, which can be damaging.

In this respect, the oscillator/inverter circuit 20 operates at a frequency between 20 and 30 kHz which frequency is controlled by transformer T1. Transformer T1's windings and material saturation flux density are chosen so that transformer T1 will saturate after a period of time about 80% of the half cycle of the desired oscillator frequency and will remove base drive from whichever transistor, Q1 or Q2, is on.

During the remaining 20% of the half cycle time, energy stored in the resonant circuit 16 connected to the inverter/oscillator circuit 20 continues to flow through diode D8 or D9 depending on whether transistor Q2 or Q1 respectively was conducting.

Once the energy in the load has dissipated, capacitor C6, which has charged to a positive or negative voltage with respect to the power supply center-tap at the junction of C1 and C2, again depending on whether transistor Q2 or Q1 was conducting, supplies voltage to restart the oscillator circuit 20 in the opposite direction of the previous half cycle.

In this way, the inverter/oscillator circuit 20 can be made to cycle so that a high frequency, alternating voltage output is generated. This output may then be applied, directly or through a step-up or a step-down transformer, to various loads, such as fluorescent lamps in series or parallel connection, incandescent lamps such as low voltage halogen lamps or other loads.

Additionally, the inductance of transformer T1's primary can be selected such that it will "mirror" the inverter load's voltage. That is, if the load consisted of a step-down transformer for halogen lighting for example, the inductance of transformer T1's primary could be selected to match the inductance of the step-down transformer's primary in a fixed ratio.

If this ratio represented the voltage at which transformer T1 just saturates compared to the voltage on the primary of the step-down transformer at which the ideal voltage is maintained on the lamp load, the lamp voltage would be maintained at a constant level over all variations in the AC input supply. This "mirroring" effect will also benefit other types of loads connected to the oscillator/inverter circuit 20, especially a load connected by means of a resonant circuit since such resonant circuits will "run away" (draw large currents and produce very high voltages) if the load should accidentally be removed.

With respect to providing a "dimming" capability to the circuit 10 when such is used with fluorescent lamps, it will be understood that during normal operation transistor Q5 is biased on, and the setting of resistor R20 determines the voltages on capacitors C11 and C12 by way of transistors Q3 and Q4. The voltage on capacitors C11 and C12 controls the frequency of the inverter/oscillator circuit 20 by determining peak voltage at which transformer T1 saturates. This in turn changes the point on the resonant curve at which the oscillator 20 is running and provides variable current to the lamps and allows them to be dimmed.

In other words the variable resistor R20 controls how much power is supplied to the load, causing variations in power. The amount of discharge from capacitors C12 and C11 is controlled by discharging them through transistors Q3 and Q4 and resistors R12 and R9 controlled by current through diodes D10 and D11, and resistor R20 which is a variable resistor. The more capacitors C12 and C11 discharge, the longer it will take for transformer T1 to charge them up again. That in effect also controls the frequency of the electrical inverter/oscillator 20.

Figure 2:
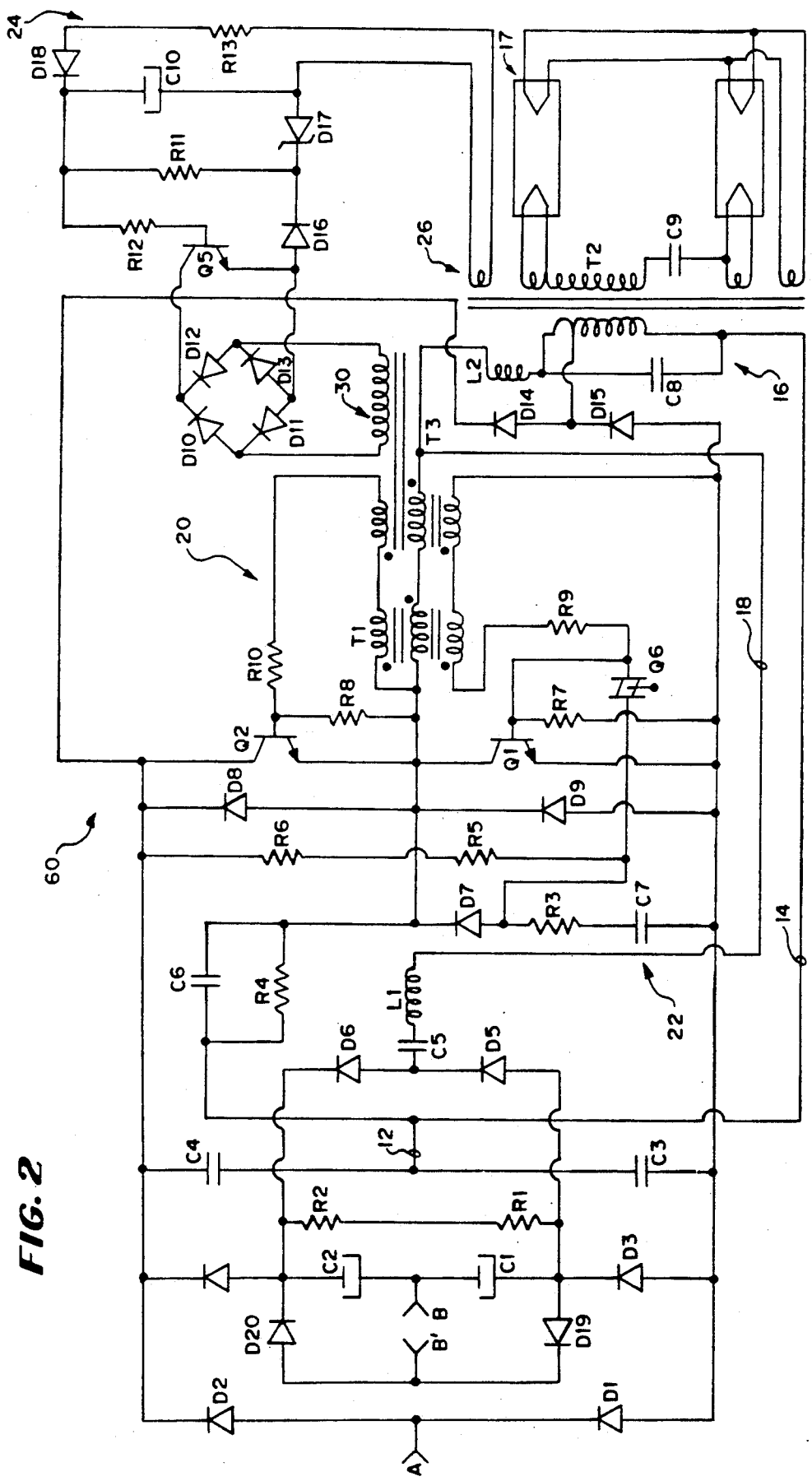
FIG. 2 is a detailed schematic of the circuit of FIG. 1 which has been modified slightly to accommodate means for allowing selection of a desired level of output from the circuit.

Turning now to the slightly modified circuit 60 shown in FIG. 2, the frequency here is controlled by two transformers, T1 and T3. For the sake of simplicity like components are labeled identically to those in FIG. 1.

The inductance of the primaries of transformers T1 and T3 is selected such so that they will "mirror" the load on the oscillator/inverter circuit 20

That is, as AC power rises to its peak value and more current is drawn through transformers T1 and T3, the magnetic material saturates sooner than it would at lower voltages, causing the frequency to shift and vary in synchronization with the fluctuations of power on the input line. This, in turn, changes the point on the resonant curve at which the oscillator/inverter circuit 20 is running and provides essentially constant current to the load.

The protection circuit 24 of this embodiment has been modified slightly from that proposed in the circuit 10 of FIG. 1.

In this respect, the protection circuit 24 comprises a control winding 30 on transformer T3, a sense winding 26 on transformer T2, and a transistor Q5 which turns on and shorts the control winding 30 on transformer T3 through diodes D10-D13. If voltage on capacitor C10, which is the peak detected voltage of the sense winding 26 on transformer T2 rises above a level fixed by Zener diode D17, transistor Q5 is turned on and shorts control winding 30 on transformer T3 through diodes D10-D13, bypassing transformer T3 so that only transformer T1's frequency, which is much higher than the frequency generated by transformers T1 and T3 in series, has effect, reducing power in the oscillator/inverter circuit 20. At the same time the correct voltage for starting the fluorescent lamps is maintained in the circuit 10 with the control winding 30 of T3 also being used for power control in the circuit 10.

It will be understood that the higher the oscillator 20 frequency is, in a direction away from the resonant frequency, the less effect it has and the lower will be the actual power contribution. It will be understood that transformer T3 is used to feed the diodes D10-D13 and transformers T1 and T3 in series are used to determine the frequency and hence the power of the inverter/oscillator circuit 20, which feeds drive current back to transistors Q1 and Q2. Then, as the transistor Q5 turns on, shorting out transformer T3 increasing the frequency effectively when transformer T3's secondary is shorted, and will effectively also short the primary of transformer T3, taking transformer T3 effectively out of the circuit 10. This is because whatever happens in the secondary, is mirrored in the primary.

As described above the circuits 10 and 60 have a number of advantages, some of which have been described above and others of which are inherent in the invention. Also, modifications may be made to the circuits 10 and 60 without departing from the teachings of the present invention. Accordingly the scope of the invention is only to be limited as necessitated by the accompanying claims.

I claim:

1. An inverter circuit including circuitry components adapted to perform various functions, said circuitry including:
    means for receiving an AC power input;
    means for modifying said AC power received to a high frequency AC output supplied to a load;
    means for storing a DC voltage;
    means for providing power factor correction for the circuit by feeding back a portion of the high frequency AC output as a DC output voltage to said means for storing said DC voltage via a current limiting inductor and a DC blocking capacitor;
    means for taking said stored DC voltage and providing same through a series of devices to a power unit and modifying the input in respect of a load placed upon said power unit;
    said circuit further including means for sensing when the load is missing and allowing said power unit to remain in a standby mode of operation until a load is sensed; and further including means for selectively controlling the amount of power available to the load.

2. The circuit of claim 1 wherein said means for modifying said AC power received to a high frequency AC output comprise a resonant oscillator/inverter circuit.

3. The circuit of claim 2 wherein said oscillator/inverter circuit includes at least one transformer.

4. The circuit of claim 3 wherein said means for selectively controlling the amount of power available to the load comprises a dimming circuit which includes a variable resistor.

5. The circuit of claim 4 wherein said variable resistor controls the voltage on a capacitor in series with a saturating transformer, which voltage controls the frequency of said oscillator/inverter circuit.

6. The circuit of claim 5 wherein windings and material saturation flux density of the transformer are chosen so the transformer saturates after a predetermined period of time relative to the oscillator frequency.

7. The circuit of claim 6 further including a step up or a step down transformer between the source of high frequency voltage and the load.

8. The circuit of claim 7 wherein the inductance of a primary winding of the transformer is set to mirror the voltage of the inverter load.

9. The circuit of claim 8 including an H bridge converter.

10. The circuit of claim 9 wherein said H bridge converter comprises two bypass capacitors forming one leg thereof and two transistors forming the other leg thereof.

11. The circuit of claim 10 including a resonant tank comprising a transformer primary, a capacitor and an inductor.

12. The circuit of claim 11 wherein a center tap is provided between said bypass capacitors which forms an AC current bypass path from said resonant tank.

13. The circuit of claim 12 wherein said AC bypass path is centered between an absolute maximum and absolute minimum power supply voltage.

14. The circuit of claim 13 wherein said capacitor of said AC bypass path creates a blockage against DC power attempting to pass therethrough.

15. The circuit of claim 14 wherein said power capacitors are discharged when the input power level falls below that stored in the capacitors.

16. The circuit of claim 15 including a transformer which determines the frequency of oscillation of the oscillator/inverter circuit.

17. The circuit of claim 16 wherein said transformer is realized by a saturable inductor.

18. The circuit of claim 17 wherein the output from said transformer is directed through a series connected inductor and DC blocking capacitor, creating a frequency changing effect within the circuit.

19. The circuit of claim 18 wherein a starting circuit is provided for the oscillator/inverter circuit.

20. The circuit of claim 19 wherein said starting circuit includes a triggering device.

21. The circuit of claim 20 wherein said triggering device comprises a bidirectional trigger diode.

22. The circuit of claim 21 including means for disabling said trigger diode once said oscillator/inverter circuit is started.

23. The circuit of claim 22 wherein said oscillator/inverter circuit includes two transistors which are driven by said transformer in an alternating mode of operation.

24. The circuit of claim 23 wherein said alternating mode of operation is triggered by zero voltage crossings.

25. The circuit of claim 24 wherein said transistors alternately turn on into zero voltage at each crossing.

26. The circuit of claim 25 including means for controlling the voltage attained by said transformer.

27. The circuit of claim 24 wherein the resonant frequency is chosen to be slightly lower than the driving frequency for the transformer.

28. The circuit of claim 27 including a secondary transformer.

29. The circuit of claim 28 wherein said resonant tank is provided by the primary of the secondary transformer.

30. The circuit of claim 29 wherein a load is presented to the secondary transformer by an inductor placed in series with the primary of the transformer.

31. The circuit of claim 30 wherein two diodes are tapped into the primary of the secondary transformer for clamping voltage away to just prior to starting of the load.

32. The circuit of claim 31 wherein power generated by the first transformer is fed to and stored in the resonant tank of the secondary transformer.

33. The circuit of claim 32 including shutdown protection means.

34. The circuit of claim 33 wherein said shutdown protection means include a Zener diode, the breakdown voltage of which is chosen to mirror the voltage on the sense winding of the secondary transformer when the load is present.

35. The circuit of claim 34 wherein said Zener diode controls the function of a transistor which in turn controls operation of the oscillator/inverter circuit, such that, upon de-energization of the transistor, the oscillator/inverter circuit enters a quiescent, standby mode of operation.

36. The circuit of claim 35 wherein said transistor controls both sides of the oscillator/inverter circuit.

37. The circuit of claim 36 wherein said transistor is de-energized upon the sensing of a load present at the output of the secondary transformer.

38. The circuit of claim 36 wherein a fixed ratio may be set between the inductance on the primary of the first transformer of that of the secondary transformer.

39. An inverter circuit including circuitry components for performing various functions, said circuitry including:
   means for receiving an AC power input;
   means for modifying said AC power received to a high frequency AC output supplied to a load;
   means for storing a DC voltage;
   means for providing power factor correction for the circuit by feeding back a portion of the high frequency AC output as a DC output voltage to said means for storing said DC voltage via a current limiting inductor and a DC blocking capacitor;
   means for taking said stored DC voltage and providing same through a series of devices including series connected transformers to a power unit and modifying the input in respect of a load placed upon said power unit;
   said circuit further including means for sensing when the load is missing and allowing said power unit to remain in a standby mode of operation until a load is sensed.

40. The circuit of claim 39 wherein said series connected transformers cause a frequency shift in power generated therethrough which synchronizes with any fluctuations in input power, to maintain current levels to a load placed thereon constant.

41. The circuit of claim 40, wherein one of said series connected transformers is capable of being removed from the circuit when the load is removed from the circuit.

42. The circuit of claim 41 including a shutdown protection circuit.

43. The circuit of claim 42 wherein said shutdown protection circuit comprises a control winding on one of the series connected transformers, a sense winding on a load driving transformer, and a transistor which, when turned on shorts out the control winding through a diode bridge removing one of the series transformers from the circuit, reducing power in an inverter circuit being fed thereby.

44. The circuit of claim 43 further including a Zener diode which control the actuation of the transistor by engaging same when a voltage above its breakdown voltage is generated by the sense winding of the load powering transformer.

45. The circuit of claim 44 accommodating two sources of AC voltage for powering, thereof.

46. The circuit of claim 45 wherein input power from a low voltage source passes along a primary path wherein said low voltage is doubled.

47. The circuit of claim 46 wherein said primary path includes a voltage doubler when outputs a doubled DC voltage.

48. The circuit of claim 47 wherein input power from a high voltage source is passed directly through a secondary path including a full wave bridge rectifier.

* * * * *